April 19, 1960 R. L. WALKER 2,933,548
ELECTRIC STORAGE BATTERY CARRIERS
Filed May 16, 1956 3 Sheets-Sheet 3

Inventor
R. L. Walker
By Glascock Downing & Seebold
Attys.

United States Patent Office 2,933,548
Patented Apr. 19, 1960

2,933,548

ELECTRIC STORAGE BATTERY CARRIERS

Roy Lawton Walker, Dagenham Dock, England, assignor to The Chloride Electrical Storage Company Limited, London, England Application May 16, 1956, Serial No. 585,216

4 Claims. (Cl. 136—171)

This invention relates to electric storage battery carriers or the like.

Batteries for certain purposes have to be equipped with means by which they are held down in the positions they are to occupy so that they shall not move about relatively to the machine in which they are installed when the latter is in motion lest they cause damage to themselves or other apparatus or personnel in the vicinity.

An object of the invention is to provide improved carrying and fixing means for storage batteries, particularly those of the monobloc type wherein cells are housed in compartments formed by partitions within a single container, which satisfy the above requirement where large forces have to be withstood, as in aircraft for example, and which are also relatively light in weight.

Another object is to provide carrying means which is adapted for satisfactorily holding-down a storage battery container made from materials, such as polystyrene resin for example, which are not as strong as those employed until recently and which may have walls of relatively thin cross-section.

Another object is to provide an improved carrying and holding-down means for storage batteries in which a substantial degree of protection against damage by chipping, denting or cracking of the containers, and particularly of the bottom and lower corners thereof, is afforded.

Another object is to provide a carrying and holding-down means for storage batteries with means for attaching a carrying handle so that its effective point of anchorage is above the center of gravity of the battery, yet any stresses are imposed on the container at the bottom where they may be best withstood.

Figure 1:
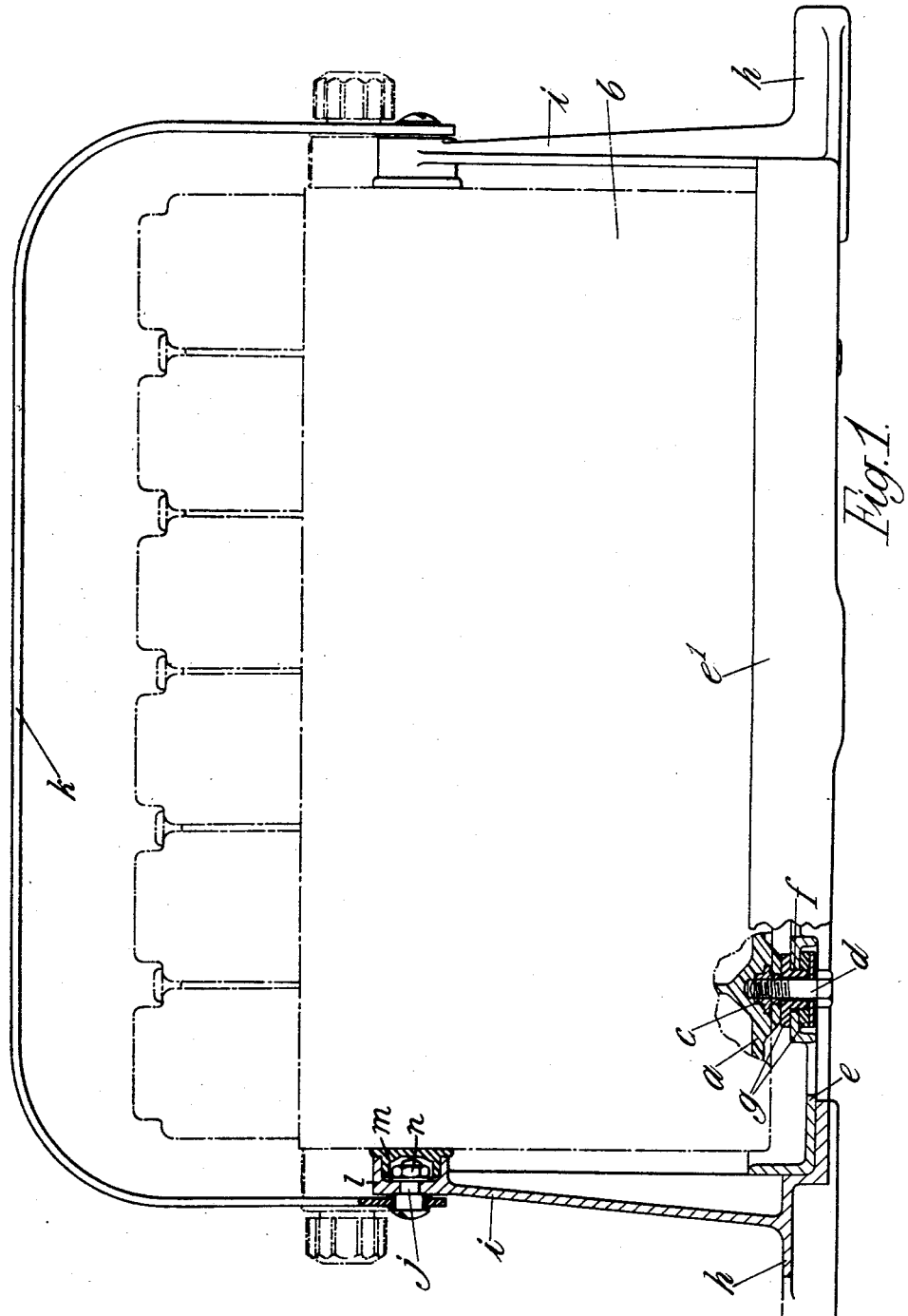
Figure 2:
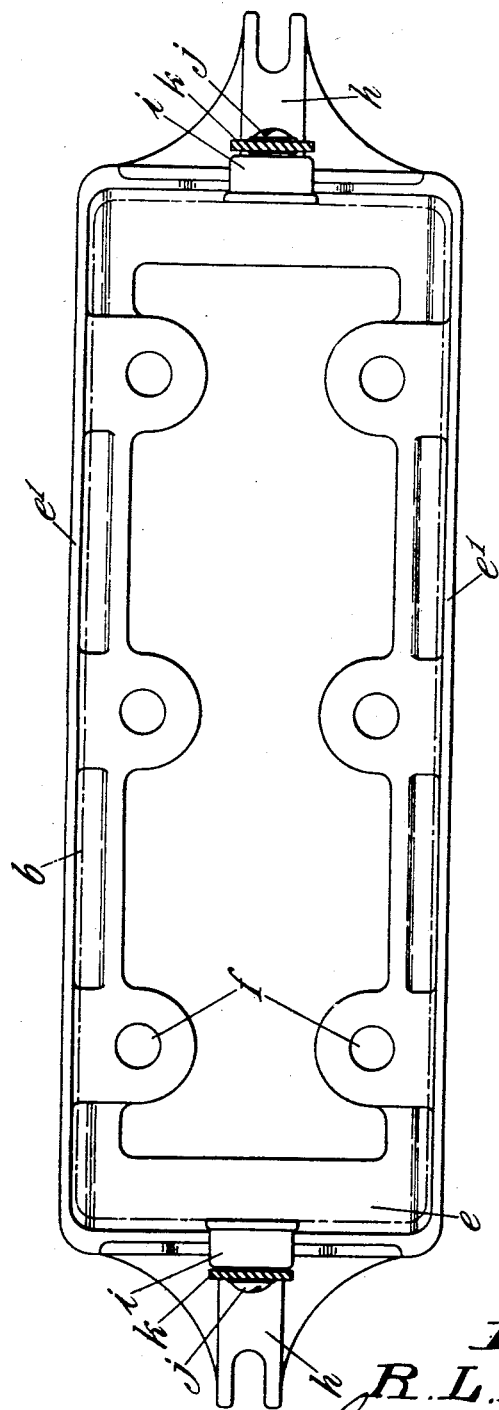
Figure 3:
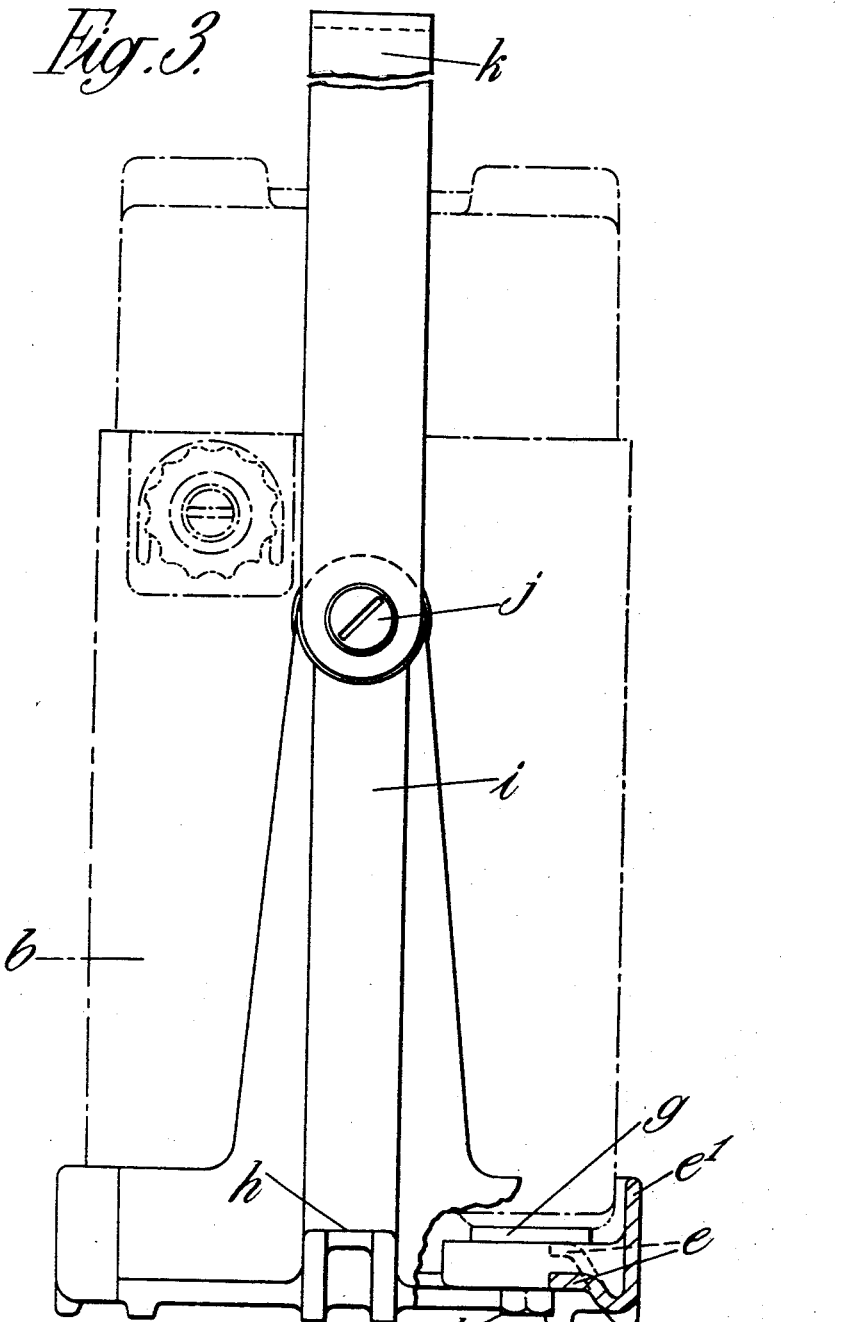

Referring to the accompanying diagrammatic drawings:

Figure 1 is a sectional elevation of a battery in a monobloc container mounted on a convenient form of holding-down device embodying the present invention, Figure 2 is a plan view of the rigid base, and Figure 3 is an end elevation of the battery and rigid base.

In carrying the invention into effect according to one convenient form as illustrated by way of example, the bottom $a$ of a monobloc battery container $b$ has moulded thereinto a plurality of metal socket members $c$ internally threaded for the reception of screws or bolts $d$. The bottom of the container $b$ is adapted to rest upon a rigid base $e$ of skeleton form furnished with holes $f$ through which the securing screws or bolts $d$ may be passed to engage the holes in the moulded-in inserts $c$. Washers or bushes $g$ of resilient material e.g. rubber or fibre, are interposed between the heads of the screws and the base $e$ and between this base and the bottom $a$ of the container.

The base is furnished with a convenient number, say, two projecting lugs $h$ by means of which it may be bolted directly to a structure upon which the battery is to be supported. By this means any loads or accelerations applied to the structure are transmitted to the battery container via the base $e$, the resilient washers and/or bushes $g$ and the bolts $d$, and vice versa. Thus, while in the static condition such loads are applied in full to the container, the resilience of the washers and/or bushes relieves the container to some extent of sudden shock or accelerating forces and keeps the stresses on the container within limits acceptable for the material chosen.

The edges $e'$ of the base $e$ are curved upwards to form a flange running round the perimeter of the base, such flange continuing in a vertical direction to a higher level than the bottom of the container $b$ and spaced horizontally a short distance away from the container. Thus the bottom of the container and its lower edges and corners cannot be hit directly on the ground or against another object and thereby be damaged, for they are protected by the flange $e'$.

The base $e$ is furnished with brackets $i$ adapted to be attached thereto by means not shown in order to provide anchorage points $j$ for a carrying handle $k$ for the battery on a level higher than its center of gravity. The upper end of the bracket $i$ is formed with a hollow boss $l$ having an inwardly facing circular recess into which is fitted a resilient or rubber buffer $m$ which is hollow on its inner side to accommodate therein a nut $n$ which secures the anchorage bolt $j$ in its bore in the bracket $i$ (Figure 2). The purpose of the buffer $m$ is to prevent sharp edges of the bracket $i$ from coming into contact with the end of the battery container, as might happen if the container moves relatively to the bracket due to its mounting on the resilient bushes $g$.

The base may be formed of any conventional material e.g., metal such as aluminum or a light alloy, or alternatively, it may be made of a sufficiently strong plastic material such as glass-fibre reinforced polyester resin.

It may have a number of holes made in it to reduce its weight or it may be made in the form of a skeleton plate or tray, e.g. as shown.

While the resilient mounting between the frame and the container is a desirable feature in reducing stresses on the latter, it may if desired be dispensed with.

I claim:

1. A carrying and fixing means for a monobloc electric storage battery comprising a rigid base having an upstanding flange extending about the perimeter of the base, lug means integral with the base and projecting outwardly therefrom for serving as means to secure the base to a supporting structure, the rigid base having a plurality of openings therein with said openings being spaced a substantial distance inwardly of the upstanding flange on the base, a battery container of lesser dimensions than the rigid base provided with a plurality of threaded metal inserts in the bottom thereof adapted to be brought into registry with the openings in the base, a threaded fastening means positionable in each of said openings and engageable in each of said threaded metal inserts to anchor the battery container firmly to the rigid base with the walls of the battery container spaced inwardly of the upstanding flange whereby said flange shields the lower edges and corners of the battery container from damage, a pair of diametrically opposed brackets carried by the base and extending upwardly vertically from the base with the free end of each bracket terminating at a level above the center of gravity of the battery container, and means adjacent the free end of each bracket serving as an anchorage for each end of a carrying handle.

2. A carrying and fixing means as claimed in claim 1, in which each bracket is provided with a hollow boss facing the adjacent wall of the battery container and a resilient buffer means being positioned in said boss for engaging the adjacent wall of the container and thereby prevent direct contact between the bracket and the container.

3. A carrying and fixing means as claimed in claim 1, further including resilient washer means interposed between each threaded fastening means, the rigid base, and the bottom of the container.

4. A carrying and fixing means as claimed in claim 1, in which said base is of skeleton form and composed of a synthetic plastic material.

References Cited in the file of this patent
UNITED STATES PATENTS

| | | |
|---|---|---|
| 1,459,973 | Colgan | June 26, 1923 |
| 1,464,216 | Paden | Aug. 7, 1923 |
| 1,591,940 | Joyce | July 6, 1926 |
| 2,159,042 | Odell | May 23, 1939 |
| 2,181,304 | Lord | Nov. 28, 1939 |
| 2,370,799 | Kelley | Mar. 6, 1945 |
| 2,710,660 | Coleman | June 14, 1955 |

FOREIGN PATENTS

| | | |
|---|---|---|
| 646,455 | France | May 17, 1927 |